F. MOENCH.
SOLDERING IRON.
APPLICATION FILED NOV. 23, 1915.
1,221,566.
Patented Apr. 3, 1917.
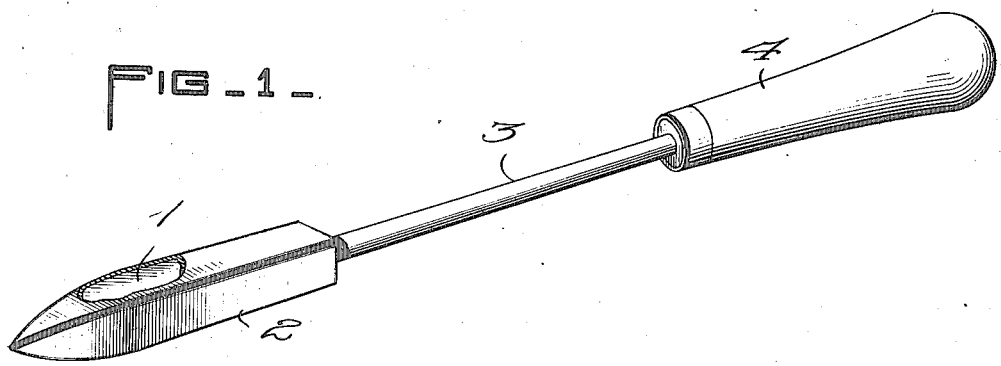
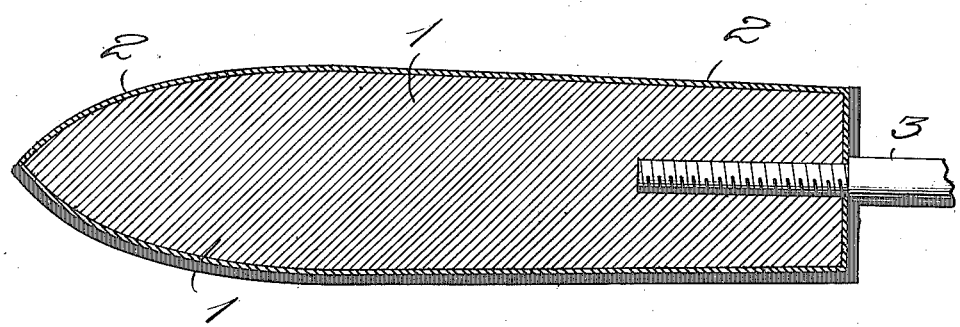
WITNESSES:
John Y. Phillips
H. E. Beck
INVENTOR
FREDERICK MOENCH
BY Munn & Co
ATTORNEYS

UNITED STATES PATENT OFFICE.

FREDERICK MOENCH, OF RUSHVILLE, ILLINOIS.

SOLDERING-IRON.

1,221,566.     Specification of Letters Patent.     Patented Apr. 3, 1917.

Application filed November 23, 1915. Serial No. 62,964.

*To all whom it may concern:*

Be it known that I, FREDERICK MOENCH, a citizen of the United States, and a resident of Rushville, in the county of Schuyler and State of Illinois, have invented a certain new and useful Improvement in Soldering-Irons, of which the following is a specification.

My invention relates to improvements in soldering irons, and it consists in the combinations, constructions, and arrangements herein described and claimed.

An object of my invention is to provide a soldering iron which is more efficient than the ordinary soldering iron due to the fact that the body portion of the soldering iron consists of a combination of metals, each of which has its peculiar features.

A further object of my invention is to provide a soldering iron in which the main body portion consists of a metal which has a relatively high conductivity, such as aluminum, and which is comparatively light, this body portion having a coating or plating of zinc.

A further object of my invention is to provide a soldering iron so constructed as to tend to prevent the oxidizing of the solder while the latter is being carried by the iron, and also to prevent the oxidizing of the solder while applying the solder to the article to be soldered.

Other objects and advantages will appear in the following specification, and the novel features of the invention will be particularly pointed out in the appended claims.

My invention is illustrated in the accompanying drawing forming a part of this application, in which—

Figure 1 is a perspective view of the soldering iron.

Fig. 2 is an enlarged section through the body portion of the soldering iron.

In carrying out my invention, I make a body portion which is preferably of aluminum. This body portion is shown at 1, and may be of any form or shape. The body portion is covered with a coating of zinc 2, the coating being secured in any suitable manner. The body portion 1 is preferably provided with a shank 3 of steel or other suitable material, while a handle 4 of wood or other material completes the device. A soldering iron constructed according to my invention has numerous advantages. In the first place, the zinc coating keeps the solder from oxidizing on the soldering iron. It renders the "iron" more susceptible to the absorption of heat. It holds the heat longer in the body portion, and gives off the heat more rapidly to the article to be soldered. Practical experiments with this form of iron would seem to indicate that in some way the heat is concentrated in the locality where the solder is desired. Especially is this true in the soldering of aluminum articles.

The aluminum body portion of the "iron" absorbs heat rapidly and on the other hand it gives it out rapidly, so that even with the coating of the zinc the heat is supplied, for instance, to an article of aluminum which is to be soldered faster than the aluminum article can carry away the heat, thereby rendering the operation of soldering successfully.

The zinc coating or plating also prevents the tin, lead, or solder from oxidizing while applying the metal to the article to be soldered.

By the use of the zinc plating or coating, the soldering iron can carry an excessive amount of solder if needed, or can carry a very small amount. Any part of the iron can be used in soldering. One of the advantages of this iron is that the article to be soldered does not need to be heated before or while applying the solder. This is true even if the article to be soldered is aluminum. The "iron" is of light weight and therefore does not tire the operator as much as a heavier iron would. It is also relatively cheap to manufacture.

I claim:—

1. In a soldering iron, a body portion of relatively light material, and an outer plating of zinc.

2. In a soldering iron, a body portion of relatively high conductivity, and an outer layer or plating of zinc.

3. In a soldering iron, a metallic body portion, and an outer coating or plating of zinc.

FREDERICK MOENCH.

Witnesses:
JOHN S. BAGBY,
BRUCE SHINDEL.